(12) United States Patent
Di Domenico

(10) Patent No.: US 10,330,014 B2
(45) Date of Patent: Jun. 25, 2019

(54) INTAKE LINER

(71) Applicant: ROLLS-ROYCE PLC, London (GB)

(72) Inventor: Massimiliano Di Domenico, Neufahrn bei Freising (DE)

(73) Assignee: ROLLS-ROYCE plc, London (GB)

( * ) Notice: Subject to any disclaimer, the term of this patent is extended or adjusted under 35 U.S.C. 154(b) by 894 days.

(21) Appl. No.: 14/682,514

(22) Filed: Apr. 9, 2015

(65) Prior Publication Data

US 2015/0308346 A1    Oct. 29, 2015

(30) Foreign Application Priority Data

Apr. 25, 2014   (GB) .................... 1407313.4

(51) Int. Cl.
| | | |
|---|---|---|
| *B64C 33/02* | (2006.01) | |
| *F02C 7/24* | (2006.01) | |
| *F02K 1/82* | (2006.01) | |
| *F02C 7/045* | (2006.01) | |
| *F02C 7/04* | (2006.01) | |

(52) U.S. Cl.
CPC ............... *F02C 7/24* (2013.01); *F02C 7/04* (2013.01); *F02C 7/045* (2013.01); *F02K 1/827* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 3,819,008 A | 6/1974 | Evans et al. | |
| 4,104,002 A | 8/1978 | Ehrich | |
| 4,969,535 A | 11/1990 | Arcas et al. | |
| 5,014,815 A | 5/1991 | Arcas et al. | |
| 5,025,888 A | 6/1991 | Arcas et al. | |
| 6,360,844 B2 | 3/2002 | Hogeboom et al. | |
| 7,707,708 B2 * | 5/2010 | Douglas ............... | B29C 33/485 29/718 |
| 2004/0094359 A1 | 5/2004 | Porte et al. | |

(Continued)

FOREIGN PATENT DOCUMENTS

| | | |
|---|---|---|
| EP | 0572725 A1 | 12/1993 |
| EP | 1167186 A1 | 1/2002 |

(Continued)

OTHER PUBLICATIONS

Nov. 10, 2014 Search Report issued in British Application No. 1407313.4.

(Continued)

*Primary Examiner* — Kayla McCaffrey
(74) *Attorney, Agent, or Firm* — Oliff PLC

(57) ABSTRACT

A gas turbine engine comprising a fan and an intake liner 30, the liner 30 comprising at least two acoustic absorption segments 32 forming a duct and an axially extending splice 40 at each axially extending interface 38 between segments 32, the splice 40 being located between the segments 32. At least one of the splices 40 comprises a first portion 42 and a second portion 44, the splice 40 having a greater segment 32 separating width in the second portion 44 than in the first portion 42 so that adjacent the first portion 42 the segments 32 are closer together than adjacent the second portion 44. The first portion 42 is nearer to the fan than the second portion 44.

14 Claims, 2 Drawing Sheets

(56) References Cited

U.S. PATENT DOCUMENTS

2006/0237260 A1  10/2006  Costa et al.
2007/0102234 A1   5/2007  Prasad et al.
2008/0135329 A1   6/2008  Strunk et al.

FOREIGN PATENT DOCUMENTS

EP      1391597 A2    2/2004
EP      1715158 A2   10/2006
EP      1783346 A2    5/2007
GB      2273131 A     6/1994
WO   2012/145141 A1  10/2012

OTHER PUBLICATIONS

Sep. 8, 2015 Search Report issued in European Patent Application No. 15 16 2933.

* cited by examiner

INTAKE LINER

The present disclosure relates to gas turbine engines, splices, and liners. More specifically the disclosure relates to splices located between acoustic absorption segments of intake liners.

Historically liners have had two or more part-circumferential segments joined by splices there between to form a cylindrical liner. The liner segments are positioned around the circumference of the engine intake and are designed to absorb a proportion of the fan acoustic field propagating along the intake.

A blade passing component of a fan tone acoustic field propagates with a fundamental frequency equal to the number of blades in the fan multiplied by the rotational frequency of the fan. A further buzz frequency component may occur when the blade tips approach or exceed the speed of sound, with a fundamental frequency equal to the rotational frequency of the fan. Additional harmonic frequencies may also be present in the field at integer multiples of the fundamental frequencies. Components of the fan acoustic field also have particular modes (field pattern shapes). Modes are characterised by an azimuthal pattern variation m and a radial pattern variation n. By way of example, the azimuthal pattern variation of the fundamental frequency corresponding to blade passing is often dominated by modes with m equal to the number of blades in the fan.

Splices between the liner segments reduce the performance of the liner in absorbing the fan tone acoustic field because they cause scattering into modes that are attenuated less well by the liner. Liners without splices (zero-splice liners) are therefore preferred from an acoustic perspective. Nonetheless, while zero-splice liners can be made, they are expensive and difficult to manufacture. Zero-splice liners are also more difficult to maintain. Indeed it may be impractical to manufacture, transport, install and/or maintain a zero-splice liner for larger diameter engines.

According to a first aspect of the invention there is provided a gas turbine engine comprising optionally a fan and optionally an intake liner, the liner comprising optionally at least two acoustic absorption segments optionally forming a duct and optionally an axially extending splice optionally at each axially extending interface between segments, the respective splice optionally being located between the segments, and where at least one of the splices comprises optionally a first portion and optionally a second portion, the splice optionally having a greater segment separating width in the second portion than in the first portion, so that adjacent the first portion the segments are optionally closer together than adjacent the second portion and where further the first portion is optionally nearer to the fan than the second portion.

A mode of vibration propagating along a waveguide (in this case inside a nacelle of the gas turbine engine and/or a fan case) is a solution to the wave equation. The boundary conditions imposed by the waveguide mean that there is a minimum frequency for a particular mode at which it can propagate (the cut-on frequency for that mode). Modes with less azimuthal pattern variation (m) have lower cut-on frequencies (i.e. the frequency can be lower and yet that mode would still be cut-on and would propagate). Modes with greater azimuthal pattern variation (m) have higher cut-on frequencies and are therefore more susceptible to being cut-off (the relevant fan acoustic field component must have a higher frequency for these modes to propagate). Splices tend to be detrimental to acoustic absorption because they scatter the acoustic field, often scattering modes that would be cut-off into cut-on modes, which then propagate and increase the noise.

Where, as described above, the first portion has reduced width, the liner may approximate a zero splice liner in the first region. Consequently the first region may provide an opportunity for the fan tone acoustic field to be absorbed by the liner without significant scattering as it propagates. Because the first portion is closer to the fan than the second portion, significant absorption of the fan rotor acoustic field may already have occurred by the time it reaches the second portion, where more scattering is likely. The second portion, with its increased width, may give the splice sufficient structural integrity to accommodate its reduced width in the first portion.

Where a feature is discussed in respect of a single splice, it will be appreciated that the feature may also apply to one, a plurality or all of the additional splices between segments in the liner. Further, as will be appreciated, an intake liner in the context of the present application refers to a liner which may be present forward (i.e. upstream), or aft (i.e. downstream) of a fan associated with the intake. Further the intake liner may be positioned inside or outside of a fan case where provided. Alternatively the intake liner may be partially inside and partially outside of a fan case.

In some embodiments the first portion incorporates the end of the splice nearest to the fan. Where the first portion extends axially rearward from the end of the splice nearest the fan, scattering of the fan tone acoustic field may be further reduced.

In some embodiments the splice consists of the first and second portions. Where there are only the first and second portions in the splice, the splice may be most effective at causing less scattering while retaining the necessary strength.

In some embodiments the first portion has a consistent width throughout its extent.

In some embodiments the first portion has a variable width.

In some embodiments the width of the first portion increases in the axial direction away from the fan.

In some embodiments the first portion tapers away from the second portion towards a minimum width at its end nearest the fan.

In some embodiments the minimum width is $$\leq 2 \frac{v}{N_{max}B},$$

where v is the speed of sound, $N_{max}$ is the maximum fan speed in revolutions per minute and B is the number of blades in the fan. This may ensure that the lowest order cut-off modes are not cut-on by the splice.

In some embodiments the length of the first portion is greater than or equal to 0.02D, where D is the radius of the intake liner. This may be an approximate minimum length required in order that there is desired attenuation of cut-off modes before they may be cut-on by the second portion.

In some embodiments the second portion has a consistent width throughout its extent.

In some embodiments the second portion has a width $$\geq 4 \frac{v}{N_{max}B}$$

where v is the speed of sound, $N_{max}$ is the maximum fan speed in revolutions per minute and B is the number of blades in the fan.

In some embodiments each splice in the liner is the same.

In some embodiments the first and second portions of each liner are aligned such that an interface from the first to the second portion of each liner occurs at the same distance from the fan.

In some embodiments the liner is positioned upstream of the fan.

According to a second aspect of the invention there is provided a splice according to the first aspect.

According to a third aspect of the invention there is provided a liner according to the first aspect.

The skilled person will appreciate that a feature described in relation to any one of the above aspects of the invention may be applied mutatis mutandis to any other aspect of the invention.

Embodiments of the invention will now be described by way of example only, with reference to the Figures, in which.

Figure 1:
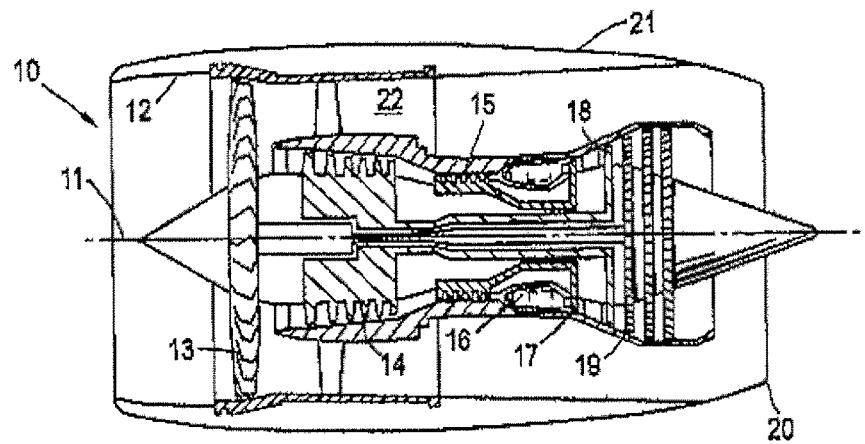
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The inner wall of the intake 12, upstream of the fan 13 would typically be provided with an intake liner (not shown) having acoustic absorption properties. The liner (not shown) may be arranged to absorb a proportion of the fan tone acoustic field propagating back through the intake 12.

Figure 2:
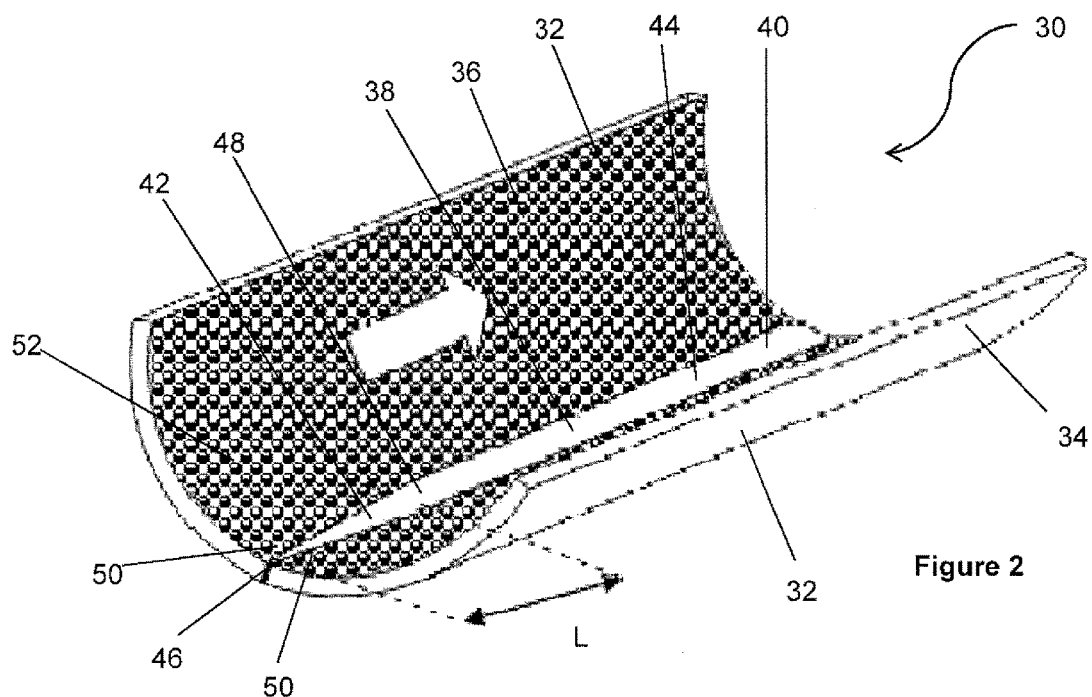
FIG. 2 is a perspective view of a portion of an intake liner according to an embodiment of the invention.

Referring now to FIG. 2, a portion of an intake liner is generally shown at 30. FIG. 2 shows two acoustic absorption segments 32 of the liner 30. When complete, the liner 30 would have four such part cylindrical segments 32, together forming an annular duct. As will be appreciated, in some embodiments the duct may not be annular and may have an alternative cross-sectional-shape corresponding to the shape of the intake and/or fan case. Each segment 32 comprises an array of acoustic absorption features. In this embodiment the acoustic absorption features consist of a regular array of honeycomb cells (not shown) disposed between a radially outer backing sheet 34 and a radially inner perforated sheet 36. As will be appreciated however, in alternative embodiments different acoustic absorption feature configurations could be used.

At an axially extending interface 38 from one segment 32 to another, an axially extending splice 40 is provided between the segments 32. Similar splices 40 would be provided as appropriate at further axially extending interfaces between segments around the circumference of the duct. As will be appreciated axial refers to a direction substantially parallel to the main rotational axis of the gas turbine engine and axially extending means that the longitudinal extent of the feature is substantially parallel to this axial direction.

Each splice consists of two portions, a first portion 42 and a second portion 44. The first portion 42, having a length L, incorporates an end 46 of the splice 40 that would be nearest to a fan of a gas turbine engine when the liner 30 is installed. The second portion 44 extends in the same direction as the first portion 42 from an end of the first portion 42 distal to its end 46. The second portion 44 would therefore be further from the fan than the first portion 42.

The second portion 44 has a greater segment 32 separating width than the first portion 42. In the present embodiment the second portion 44 therefore has a greater circumferential extent than the first portion 42. More specifically the second portion 44 has a consistent width, while the width of the first portion tapers in the axial direction from its interface 48 with the second portion 44 to a minimum at the end 46, having at all points a smaller width than the second portion 44.

The segments 32 each have a fanned region 50 of increased circumferential extent. The fanned regions 50 are axially coextensive with the first portion 42 of the splice 50. The fanned regions 50 compliment the tapering first portion 42 of the splice 40 so as the segments 32 abut the splice 40 at all points along its length. Consequently, adjacent the first portion 42, the segments 32 are closer together than adjacent the second portion 44.

The minimum segment 32 separating width in the first portion 42 (which in the embodiment of FIG. 2 occurs at the end 46) is $$\leq 2 \frac{v}{N_{max}B},$$

where v is the speed of sound, $N_{max}$ is the maximum fan speed of the fan in revolutions per minute with which the liner portion is associated in use and B is the number of blades in that fan.

The segment 32 separating width of the second portion 44 (which in the embodiment of the FIG. 2 is consistent throughout the second portion 44) is $$\geq 4 \frac{v}{N_{max}B}.$$

The length L of the first portion 42 is ≥0.02D, where D is the radius of the intake with which the liner portion is associated in use.

In use the liner portion 30 would be connected to additional liner segments 32 using additional splices 40 in order to form a complete annular duct. Within the duct, each splice 40 would be the same and would have their first 42 and second 44 portions aligned. The liner 30 would be installed inside the intake of a gas turbine engine, the liner 30 being coaxial with the intake and the backing sheet 34 abutting a radially inner surface (not shown) of the intake. The liner would be oriented so that the first portion 42 of each splice would be nearer to a fan of the gas turbine engine than the second portion 44 of each splice. The liner 30 and splices 40 would extend away from the fan in an axial direction upstream. In view of the alignment of the first 42 and second 44 portions of each splice 40 with respect to the others, the interface 48 from the first 42 to the second 44 portion of each splice 40 would occur at the same distance from the fan.

The aligned first portions 42 create an annular section 52 of liner 30 where there is relatively little separation between segments 32. This section 52, extending for only a portion of the axial length of the liner 30, therefore approximates a zero-splice liner. A fan rotor acoustic field produced by the fan and propagating along the liner 30 is therefore less likely to be scattered by the splices 40 within this section and is more likely to be absorbed by the acoustic absorption features and/or to comprise cut-off modes of vibration. When the fan rotor acoustic field reaches the second portions 44, additional scattering and/or production of cut-on modes may occur. Nonetheless because the second portions 44 are further from the fan, the residual acoustic energy contained in the propagating wave is reduced compared to the initial acoustic energy generated by the fan. Further the second portions, with their greater segment 32 separating width, allow for increased strength of segment 32 joining. The use of splices 40 also means that manufacture, transport and maintenance of the liner may be easier than if a zero-splice liner was used.

Figure 3:
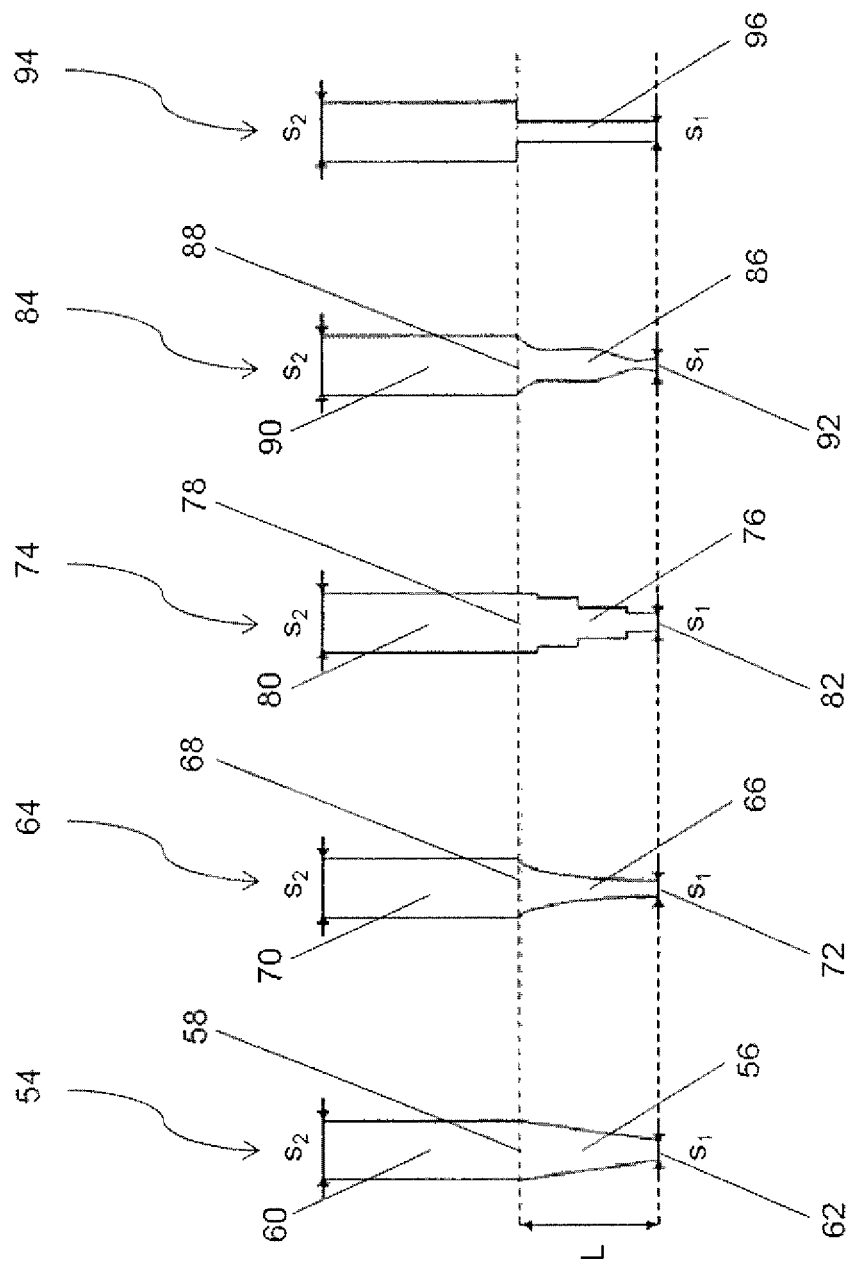
FIG. 3 shows a number of schematic representations of portions of splices according to embodiments of the invention.

Referring now to FIG. 3, various alternative splice configurations are shown. Each configuration has a first portion and a second portion, with the second portion providing a greater segment separating width than the first portion. In each case however the shape of the first portion is different.

A splice 54 has a first portion 56 which is tapered with a consistent gradient from a maximum segment separating width at an interface 58 with a second portion 60 to a minimum segment separating width at an end 62 that would in use be nearest to a fan of a gas turbine engine. The splice 54 is similar to the splice 40 of FIG. 2 and may be favourable from a mechanical perspective in view of the absence of sharp angles and/or discontinuations.

A splice 64 has a first portion 66 which is tapered with a reducing gradient from a maximum segment separating width at an interface 68 with a second portion 70 to a minimum segment separating width at an end 72 that would in use be nearest to a fan of a gas turbine engine. Splice 64 may also be favourable from a mechanical perspective in view of the absence of sharp angles and/or discontinuations.

A splice 74 has a first portion 76, the segment separating width of which reduces in a step-wise manner from a maximum at an interface 78 with a second portion 80 to a minimum at an end 82 that would in use be nearest to a fan of a gas turbine engine.

A splice 84 has a first portion 86, the segment separating width of which reduces in a step-wise manner with blended tapers between the steps, from a maximum at an interface 88 with a second portion 90 to a minimum at an end 92 that would in use be nearest to a fan of a gas turbine engine.

A splice 94 has a first portion 96, the segment separating width of which is consistent throughout its extent.

As with the splice 40 of FIG. 2, each of the splices 54, 64, 74, 84 and 94 have a minimum segment separating width $s_1$ in the first portion of $$\leq 2 \frac{v}{N_{max}B}.$$

Similarly, each of the splices 54, 64, 74, 84 and 94 have a consistent segment separating width $s_2$ in the second portion of $$\geq 4 \frac{v}{N_{max}B}.$$

Further each of the splices 54, 64, 74, 84 and 94 have a length L of the first portion corresponding to ≥0.024D.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form of gas turbine engine, splice or liner.

The invention claimed is:

1. A gas turbine engine comprising:
a fan, and
an intake liner comprising at least two acoustic absorption segments forming a duct and an axially extending splice at each axially extending interface between segments, the splice being located between the segments, wherein:
at least one splice comprises a first portion and a second portion,
the at least one splice has a greater segment separating width in the second portion than in the first portion, so that adjacent the first portion the segments are closer together than adjacent the second portion, and
the first portion is nearer to the fan than the second portion.

2. The gas turbine engine according to claim 1, wherein the first portion incorporates an end of the splice nearest to the fan.

3. The gas turbine engine according to claim 1, wherein the at least one splice consists of the first and second portions.

4. The gas turbine engine according to claim 1, wherein the first portion has a consistent width throughout its extent.

5. The gas turbine engine according to claim 1, wherein the first portion has a variable width.

6. The gas turbine engine according to claim 5, wherein the width of the first portion increases in the axial direction away from the fan.

7. The gas turbine engine according to claim 5, wherein the first portion tapers away from the second portion towards a minimum width at its end nearest the fan.

8. The gas turbine engine according to claim 7, wherein the minimum width is $$\leq 2\frac{v}{N_{max}B},$$

where v is the speed of sound, $N_{max}$ is the maximum fan speed in revolutions per minute, and B is the number of blades in the fan.

9. The gas turbine engine according to claim 1, wherein a length of the first portion is greater than or equal to 0.02D, where D is the radius of the intake liner.

10. The gas turbine engine according to claim 1, wherein the second portion has a consistent width throughout its extent.

11. The gas turbine engine according to claim 10, wherein the second portion has a width $$\geq 4\frac{v}{N_{max}B}$$

where v is the speed of sound, $N_{max}$ is the maximum fan speed in revolutions per minute, and B is the number of blades in the fan.

12. The gas turbine engine according to any claim 1, wherein each splice in the liner is the same.

13. The gas turbine engine according to claim 1, wherein the first and second portions of each splice are aligned such that an interface from the first to the second portion of each splice occurs at the same distance from the fan.

14. The gas turbine engine according to claim 1, wherein the segment separating width of the first portion reduces in a step-wise manner from a maximum at an interface with the second portion to a minimum at an end nearest the fan.

* * * * *